US012603592B2

(12) United States Patent
Huang et al.

(10) Patent No.: US 12,603,592 B2
(45) Date of Patent: Apr. 14, 2026

(54) BATTERY HEATING SYSTEM, CONTROL METHOD AND DEVICE THEREOF AND ELECTRONIC EQUIPMENT

(71) Applicant: CONTEMPORARY AMPEREX TECHNOLOGY (HONG KONG) LIMITED, Hong Kong (CN)

(72) Inventors: Xiaojian Huang, Ningde (CN); Zhimin Dan, Ningde (CN); Chenghua Fu, Ningde (CN); Wei Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 163 days.

(21) Appl. No.: 18/439,048

(22) Filed: Feb. 12, 2024

(65) Prior Publication Data

US 2024/0186928 A1     Jun. 6, 2024

Related U.S. Application Data

(63) Continuation of application No. PCT/CN2022/088301, filed on Apr. 21, 2022.

(51) Int. Cl.
*H02P 21/22* (2016.01)
*B60L 58/27* (2019.01)
*H02P 27/08* (2006.01)

(52) U.S. Cl.
CPC .............. *H02P 21/22* (2016.02); *B60L 58/27* (2019.02); *H02P 27/08* (2013.01); *B60L 2240/545* (2013.01)

(58) Field of Classification Search
CPC .......... H02P 21/22; H02P 27/08; B60L 58/27; B60L 2240/545; B60L 2240/423; B60L 3/12; B60L 15/007; B60L 15/025; B60L 15/08; B60L 2220/54; B60L 2240/425; B60L 2240/427; B60L 2240/429;
(Continued)

(56) References Cited

U.S. PATENT DOCUMENTS

2020/0212520 A1     7/2020   Dan et al.
2021/0061128 A1*   3/2021   Lee ......................... B60L 58/27
(Continued)

FOREIGN PATENT DOCUMENTS

CN       108111022 A     6/2018
CN       105577071 B     9/2018
(Continued)

OTHER PUBLICATIONS

The World Intellectual Property Organization (WIPO) International Search Report for PCT/CN2022/088301 Jan. 18, 2023 8 pages (including English translation).
(Continued)

*Primary Examiner* — Bickey Dhakal
(74) *Attorney, Agent, or Firm* — ANOVA LAW GROUP, PLLC

(57) ABSTRACT

A control method for a battery heating system. The battery heating system includes an inverter and a motor winding, and the inverter is connected to the motor winding and a battery. The control method includes acquiring a target voltage vector required for motor operation; and controlling, according to the target voltage vector, the motor winding to output a pulse current to the battery through the inverter.

9 Claims, 7 Drawing Sheets

(58) Field of Classification Search
  CPC .......... B60L 2240/662; B60L 2240/80; B60L 2260/42; B60L 58/12; H01M 2220/20; H01M 10/625; H01M 10/633; H01M 10/615; H01M 10/637
  See application file for complete search history.

(56) References Cited

U.S. PATENT DOCUMENTS

| | | |
|---|---|---|
| 2021/0288506 A1 | 9/2021 | Tanaka |
| 2021/0351732 A1 | 11/2021 | Shen |
| 2022/0014137 A1* | 1/2022 | Lee ..................... H01M 10/625 |
| 2022/0085746 A1* | 3/2022 | Lian ..................... H02P 27/085 |
| 2023/0163378 A1* | 5/2023 | Wang .................. H01M 10/425 |
| | | 318/139 |

FOREIGN PATENT DOCUMENTS

| | | | | |
|---|---|---|---|---|
| CN | 105529977 | B | 1/2019 | |
| CN | 111347936 | A | 6/2020 | |
| CN | 110224651 | B | 10/2020 | |
| CN | 112659977 | A | 4/2021 | |
| CN | 112977173 | A | 6/2021 | |
| CN | 113002366 | A | 6/2021 | |
| CN | 113183826 | A | 7/2021 | |
| CN | 113752912 | A * 12/2021 | .......... H01M 10/637 | |
| CN | 113904025 | A | 1/2022 | |
| JP | 2001197607 | A * 7/2001 | | |

OTHER PUBLICATIONS

The European Patent Office (EPO) The Extended European Search Report for Application No. 22937895.5 Oct. 22, 2024 13 Pages.

* cited by examiner

BATTERY HEATING SYSTEM, CONTROL METHOD AND DEVICE THEREOF AND ELECTRONIC EQUIPMENT

CROSS-REFERENCE TO RELATED APPLICATION

This application is a continuation of International Application No. PCT/CN2022/088301, filed on Apr. 21, 2022, the entire content of which is incorporated herein by reference.

TECHNICAL FIELD

The present application belongs to the field of batteries, and in particular relates to a battery heating system, a control method and device thereof and electronic equipment.

BACKGROUND

With the development of new energy, more and more fields use new energy as power. Batteries are widely used in new energy vehicles, consumer electronics, energy storage systems and other fields because of their advantages such as high energy density, recyclable charging, safety and environmental protection. However, the use of batteries will be subject to certain limitations in a low temperature environment. Specifically, for example, when the battery works in an environment where the temperature is too low, the temperature of the battery will gradually decrease. Therefore, in order to make the battery work normally, it is necessary to heat the battery in the low temperature environment.

At present, the heat generated by the loss of the motor during working is usually used to heat the battery to maintain the temperature of the battery working in the low temperature environment, but the heating effect on the battery is not obvious, and the battery temperature is difficult to effectively maintain within the temperature range required for the normal work of the battery.

SUMMARY

Embodiments of the present application provide a battery heating system, a control method and device thereof and electronic equipment, which can fully utilize heat generated in a battery itself to heat the battery and maintain the temperature of the battery within a temperature range required for normal work.

In a first aspect, the present application provides a control method of a battery heating system, including an inverter and a motor winding, the inverter being connected to the motor winding and a battery, and the method includes:

acquiring a target voltage vector required for motor operation;

controlling, according to the target voltage vector, the motor winding to output a pulse current to the battery through the inverter.

In a technical solution of the embodiments of the present application, the motor winding is controlled to output the pulse current to the battery through the inverter by acquiring the target voltage vector required for motor operation and combining with the target voltage vector, so that energy stored in the motor winding can be charged back to the battery through the inverter during the normal operation of a motor, and high-efficiency heating of the battery is achieved by utilizing heat generated inside the battery itself, which is beneficial to maintaining a temperature of the battery within a temperature range required by the normal operation of the battery.

In some embodiments, the controlling, according to the target voltage vector, the motor winding to output a pulse current to the battery through the inverter includes:

determining, according to the target voltage vector, a first action duration of a pulse vector in a preset period; and controlling, in the first action duration, the motor winding to output the pulse current to the battery through the inverter.

In the technical solution of the embodiments of the present application, in the first action duration in the preset period, according to the target voltage vector required for the motor operation, the first action duration of the pulse vector in the preset period is calculated, and in the first action duration, the motor winding is controlled to output the pulse current to the battery through the inverter, so that the heat generated in the battery itself can be utilized to achieve the high-efficiency heating of the battery, and the influence of power output in the motor winding on the normal operation of the motor can be avoided.

In some embodiments, the determining, according to the target voltage vector, a first action duration of a pulse vector in a preset period includes:

determining, according to preset space vector pulse width modulation information, a target sector of the target voltage vector in the preset space vector pulse width modulation information;

determining a second action duration of an effective voltage vector in the preset period according to an amplitude of the target voltage vector and positional relationship information between the target voltage vector and the target sector; and determining the first action duration of the pulse vector according to a difference between the preset period and the second action duration.

According to the embodiments of the present application, the second action duration of the effective voltage vector in the preset period can be determined from the positional relationship information between the target voltage vector and the target sector in the preset space vector pulse width modulation information. Since the target voltage vector required for motor operation can be provided, i.e., can be met, in a discharge circuit formed by the battery, the inverter and the motor winding in the second action duration, the battery can be quickly heated without affecting the motor operation in the first action duration in the preset period. Especially in a low temperature environment, it is beneficial to maintain the temperature of the battery within the temperature range required for its normal work.

In some embodiments, action time of the pulse vector is between action time of different effective voltage vectors.

According to the embodiments of the present application, in switching of different effective voltages, the control device is required to control turning on or turning off of switching units in the inverter, so power is consumed during switching of switches. By setting the action time of the pulse voltage between the action time of the different effective voltage vectors, the switching times of the switching units can be reduced, thereby reducing redundant power consumption caused by turning on or turning off the switching units.

In some embodiments, the inverter includes a plurality of switching units, each of the plurality of switching units including a switching transistor and a freewheeling diode, the switching transistor and freewheeling diode being connected in parallel; and the controlling, according to the target voltage vector, the motor winding to output a pulse current to the battery through the inverter includes:

controlling, according to the target voltage vector, turning off of the switching transistor in each of the plurality of switching units, to enable the motor winding to output the pulse current to the battery through the freewheeling diode.

According to the embodiments of the present application, by controlling the turning off of the switching transistor in each of the plurality of switching units, energy stored in a stator winding is charged back to the battery through the freewheeling diode in the inverter, and a large instantaneous pulse current is generated to form a freewheeling loop. Therefore, pulse heating for the battery can be achieved during the operation of the motor, which can effectively overcome the problem that the battery temperature gradually decreases during the operation of the motor in a low temperature environment.

In some embodiments, the acquiring a target voltage vector required for motor operation includes:

acquiring a first temperature of the battery;

acquiring operating parameters of the battery when the first temperature of the battery is less than a first temperature threshold; and acquiring the target voltage vector required for the motor operation when the operating parameters of the battery meet a heating condition of a preset pulse voltage heating mode.

According to the embodiments of the present application, in a state where the battery temperature is less than the first temperature threshold, the battery needs to be heated. Next, by determining operating parameter information of the battery, whether the operation states of the battery and the motor meet a preset pulse voltage condition is determined, so that the safety and reliability of the motor in an operation process can be improved.

In some embodiments, the method further includes:

acquiring a second temperature of the battery, the second temperature being a temperature collected in real time when the battery is in the preset pulse voltage heating mode; and stopping heating the battery or entering a preset vector control mode when the second temperature is greater than or equal to a second temperature threshold.

According to the embodiments of the present application, temperature change information of the battery in a heating process is monitored in real time by acquiring the second temperature of the battery. The safety and reliability of heating the battery during the motor operation can be improved by determining whether the battery needs switching of the heating mode or stopping heating according to the second temperature of the battery.

In some embodiments, the stopping heating the battery or entering a preset vector control mode when the second temperature is greater than or equal to a second temperature threshold includes:

acquiring a third temperature of an operating environment of the battery;

entering the preset vector control mode when the third temperature is less than a third temperature threshold; and stopping heating the battery when the third temperature is greater than or equal to the third temperature threshold.

According to the embodiments of the present application, the third temperature of the operating environment of the battery is acquired, and the heating mode of the battery is adjusted according to the third temperature, thereby ensuring the safety and reliability of the battery heating system.

In a second aspect, the present application provides a control device of a battery heating system, including an acquisition module, configured to acquire a target voltage vector required for motor operation; and a control module, configured to control a motor winding to output a pulse current to a battery through an inverter according to the target voltage vector.

In the technical solution of the embodiments of the present application, the motor winding is controlled to output the pulse current to the battery through the inverter by acquiring the target voltage vector required for motor operation and combining with the target voltage vector, so that the energy stored in the motor winding can be charged back to the battery through the inverter during the normal 20 operation of the motor, and the high-efficiency heating of the battery is achieved by utilizing the heat generated inside the battery itself, which is beneficial to maintaining the temperature of the battery within the temperature range required by the normal operation of the battery.

In a third aspect, the present application provides a battery heating system including:

an inverter, a motor winding, and the control device of the battery heating system as described in the second aspect.

In a fourth aspect, the present application provides electronic equipment including a processor and a memory storing computer program instructions; wherein the computer program instructions, when being executed by the processor, implement the control method of the battery heating system described in the first aspect or any embodiment of the first aspect.

In a fifth aspect, the present application provides a computer-readable storage medium having computer program instructions stored thereon that, when being executed by a processor, implement the method described in the first aspect or any embodiment of the first aspect.

In a sixth aspect, the embodiments of the present application provide a computer program product that, when instructions in the computer program product are executed by a processor of electronic equipment, causes the electronic equipment to perform the control method of the battery heating system as described in the first aspect or any embodiment of the first aspect.

The above description is only an overview of the technical solution of the present application. In order to better understand the technical means of the present application, it can be practiced in accordance with the contents of the specification, and in order to make the above and other objects, features and advantages of the present application more apparent and easy to understand, the specific implementations of the present application is set forth below.

BRIEF DESCRIPTION OF DRA WINGS

Various other advantages and benefits will become apparent to those of ordinary skill in the art by reading the detailed description of preferable implementations below. The drawings are for the purpose of illustrating preferable implementations only and are not considered limiting to the present application. Throughout the accompanying drawings, the same reference signs are used to indicate the same parts. In the drawings.

DETAILED DESCRIPTION OF EMBODIMENTS

Figure 1:
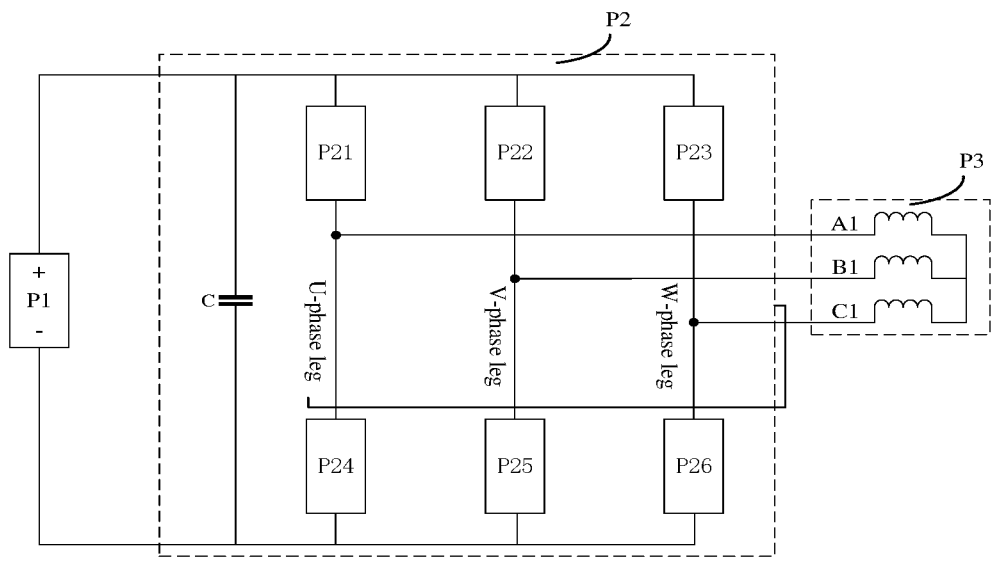
FIG. 1 is a schematic flow diagram of a control method of a battery heating system provided by embodiments of the present application.

Embodiments of the technical solution of the present application will be described in detail with reference to the accompanying drawings. The following embodiments are only intended to more clearly illustrate the technical solution of the present application and are therefore intended as examples only and are not intended to limit the scope of protection of the present application.

It is to be noted that unless otherwise stated, technical or scientific terms used in the embodiments of the present application should have a general meaning as understood by those skilled in the art to which the embodiments of the present application pertains.

In the description of the embodiments of the present application, orientation or positional relationships indicated by technical terms such as "center," "longitudinal," "transverse," "length," "width," "thickness," "up," "down," "front," "back," "left," "right," "vertical," "horizontal," "top," "bottom," "inner," "outer," "clockwise," "counterclockwise," "axial," "radial," "circumferential," etc. are based on the orientation or positional relationships shown in the drawings, for ease of description of the embodiments of the present application and simplification of the description only, these terms do not indicate or imply that the device or element referred to is required to have a specific orientation or be constructed and operated in a specific orientation, and therefore cannot be construed as limitations to the embodiments of the present application.

In addition, the technical terms "first," "second", etc. are for descriptive purposes only and cannot be construed as indicating or implying relative importance or implying the number of the indicated technical features. In the description of embodiments of the present application, "a plurality of" means more than two, unless expressly specified otherwise.

In the description of the embodiments of the present application, unless otherwise explicitly provided and limited, the technical terms such as "mount," "connect," "couple," and "fix" should be understood broadly, which, for example, may refer to a fixed connection, a detachable connection, or an integral connection; which may refer to a mechanical connection or an electrical connection; which may refer to a direct connection or an indirect connection via an intermediate medium; which may also refer to a communication between the insides of two elements or an interaction relationship between two elements. To a person of normal skill in the art, specific meanings of the above terms in the embodiments of the present application may be construed as dependent on specific situations.

With the continuous development of science and technology, the use of batteries in daily production and life is becoming increasingly widespread. Batteries are not only used in energy storage power systems such as hydraulic power, firepower, wind power and solar power stations, but also widely used in electric transportations such as electric bicycles, electric motorcycles and electric vehicles, as well as military equipment and aerospace and other fields. With the continuous expansion of battery application fields, its market demand is also constantly expanding.

A battery as referred to in the embodiments of the present application means a single physical module including one or more battery cells to provide higher voltage and capacity. Exemplarily, the battery may be a lithium ion battery, a lithium metal battery, a lead-acid battery, a nickel-cadmium battery, a nickel-hydrogen battery, a lithium-sulfur battery, a lithium-air battery, a sodium ion battery, and the like, which are not limited herein. In terms of scale, the battery in the embodiments of the present application can be a battery cell, a battery module or a battery pack, which is not limited here. In terms of application scenarios, the battery can be used in power plants such as automobiles and ships. For example, it can be used in an electric vehicle to supply power to a motor of the electric vehicle, as a power source of the electric vehicle. The battery can also supply power to other electrical components in the electric vehicle, such as a vehicle-interior air conditioner, a vehicle player, etc.

At present, the use of batteries will be subject to certain limitations in a low temperature environment. Specifically, for example, when the battery works in an environment where the temperature is too low, the temperature of the battery will gradually decrease. Therefore, in order to make the battery work normally, it is necessary to heat the battery in the low temperature environment.

The applicant of the present application has noticed that in order to make the battery work normally in a low temperature environment, the heat generated by the loss during working of the motor is often used to heat the battery, so as to maintain the temperature of the battery working in a low temperature environment. Specifically, for example, when an electric vehicle is running, the heat generated by the loss during working of the motor is used to heat a coolant, and the heated coolant is used to heat the battery to maintain the temperature required for the battery to work. However, when the environment low temperature is too low, the heating effect on the battery by using the heat generated by the loss during working of the motor is not so good, and the battery temperature is easy to decrease gradually, which makes it difficult to effectively maintain the battery temperature within the temperature range required for the normal work of the battery.

Based on the above considerations, in order to solve the problem that it is difficult to effectively maintain the battery in the temperature range required for normal work of the battery. The present application provides a battery heating system, a control method and device thereof and electronic equipment after thorough research by the applicant. Specifically, the battery heating system includes an inverter and a motor winding, the inverter is respectively connected to the motor winding and a battery. When the battery provides a target voltage vector for a motor based on a voltage vector required for motor operation, the motor winding is controlled to output a pulse current to the battery through the inverter by acquiring the target voltage vector required for motor operation and combining with the target voltage vector, so that energy stored in the motor winding can be charged back to the battery through the inverter during the normal operation of the motor, and the high-efficiency heating of the battery is achieved by utilizing the heat generated inside the battery itself, which is beneficial to maintaining the temperature of the battery within the temperature range required by the normal operation of the battery.

The technical solution described in the embodiments of the present application is applicable to a battery and to an electrical device that uses the battery. The electrical device may be a vehicle, a cell phone, a portable device, a laptop, a ship, a spacecraft, an electric toy, and an electric tool, etc. The embodiments of the present application do not have special restrictions on the above-mentioned electrical devices.

The control method of the battery heating system provided by the embodiments of the present application will be described in detail with reference to the accompanying drawings through specific embodiments and application scenarios.

When a battery is used as a power source of a power plant, it is necessary to convert electric energy provided by the battery into mechanical energy through a battery power system. FIG. 1 is a system architecture diagram of an exemplary battery power system provided by embodiments of the present application.

Referring to FIG. 1, the battery power system may include an inverter P2 connected to a battery P1, and a motor winding P3 connected to the inverter P2.

For the inverter P2, which may be shown in FIG. 1, the inverter P2 includes three-phase legs: a U-phase leg, a V-phase leg, and a W-phase leg. Each of the three-phase legs has an upper leg and a lower leg, and each of the upper leg and the lower leg is provided with a switching unit.

For example, as shown in FIG. 1, the switching unit of the upper leg of the U-phase leg is a first switching unit P21, the switching unit of the upper leg of the V-phase leg is a second switching unit P22, and the switching unit of the upper leg of the W-phase leg is a third switching unit P23. The switching unit of the lower leg of the U-phase leg is a fourth switching unit P24, the switching unit of the lower leg of the V-phase leg is a fifth switching unit P25, and the switching unit of the lower leg of the W-phase leg is a sixth switching unit 26.

As for the motor winding P3, which may be shown in FIG. 1, the motor winding P3 may specifically include a U-phase winding L1, a V-phase winding L2, and a W-phase winding L3. One end of the U-phase winding L1 is connected to a connection point of the upper and lower legs of the U-phase legs. One end of the V-phase winding L2 is connected to a connection point of the upper and lower legs of the V-phase legs. One end of the W-phase winding L3 is connected to a connection point of the upper and lower legs of the W-phase legs.

Based on the above concepts, the battery heating system of the embodiments of the present application is described in detail below. It is to be noted that the battery heating system provided by the embodiments of the present application can be achieved on the basis of the original power system and various management systems of the battery.

Figure 2:
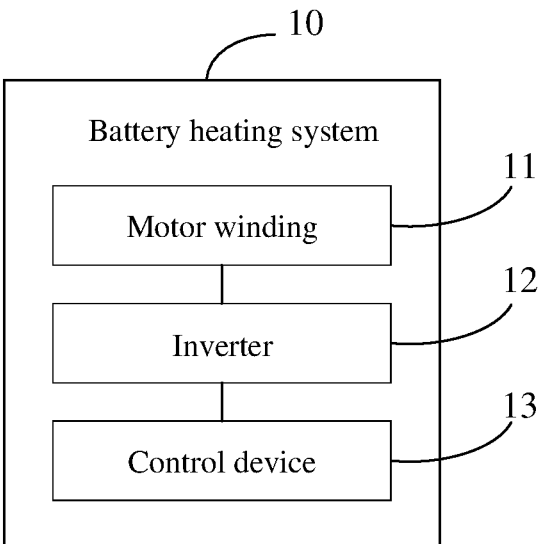
FIG. 2 is a system architecture diagram of a battery heating system provided by the embodiments of the present application.

FIG. 2 is a system architecture diagram of a battery heating system provided by the embodiments of the present application. As shown in FIG. 2, the battery heating system 10 may include a motor winding 11, an inverter 12 and a control device 13.

The motor winding 11 may include the U-phase winding L1, the V-phase winding L2, and the W-phase winding L3 shown in FIG. 1.

The inverter 12 may include the U-phase leg, the V-phase leg, and the W-phase leg shown in FIG. 1, and the switching units provided on the upper leg and the lower leg of each of the three-phase legs described above. The inverter 12 is also connected to a battery (not shown in FIG. 2).

The control device 13 may be embodied as a Motor Control Unit (MCU). Specifically, the MCU may output a drive signal to the switching units of the upper leg and the lower leg to control the switching units of the upper leg and the lower leg to be turned on and off periodically. The driving signal may be a pulse signal in particular. Exemplarily, the drive signal may be a pulse width modulated signal or the like. For example, a high level in the drive signal may drive the switching unit to be turned on, and a low level signal in the drive signal may drive the switching unit to be turned off. The driving signal can control the switching unit of the target upper leg and the switching unit of the target lower leg to be turned on and off periodically.

Figure 3:
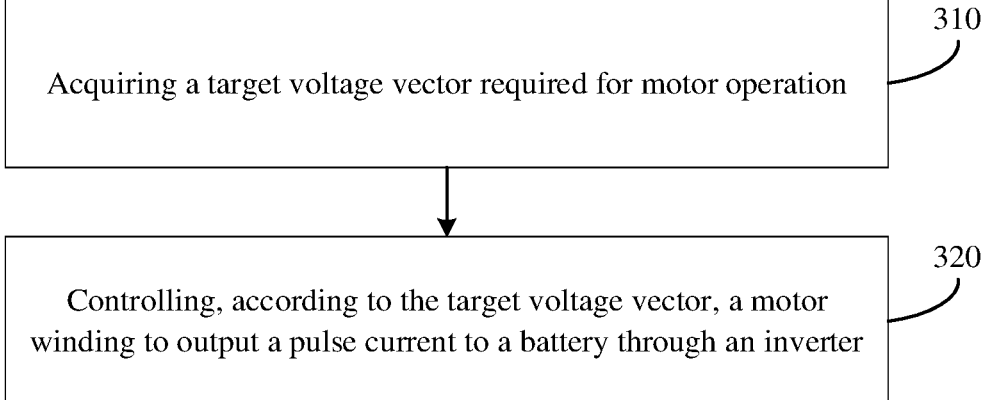
FIG. 3 is a schematic flow diagram of a control method of a battery heating system provided by the embodiments of the present application.

Based on the above-mentioned battery heating system, the embodiments of the present application provide a control method of the battery heating system. Please refer to FIG. 3, FIG. 3 is a schematic flow diagram of the control method of the battery heating system provided by the embodiments of the present application. The control method of the battery heating system may include the following steps 310 to 320.

Step 310, acquiring a target voltage vector required for motor operation.

Step 320, controlling, according to the target voltage vector, a motor winding to output a pulse current to a battery through an inverter.

According to the above steps, the target voltage vector is a voltage vector required for motor operation. For example, when an electric vehicle is running, the motor, as a power device, may convert electric energy provided by a battery into mechanical energy to drive the electric vehicle to run.

Exemplarily, during the running of the electric vehicle, a target voltage vector required by the electric vehicle during running may be transmitted to a control device. Specifically, the control device in the battery heating system may be specifically implemented as a Battery Management System (BMS) or a Vehicle Control Unit (VCU), or may be a function module set separately, which is not limited herein. According to the received target voltage vector, the control device obtains an effective voltage vector to be supplied to the motor and a pulse vector that the motor winding can supply to the battery through the inverter.

In the embodiments of the present application, the motor winding is controlled to output the pulse current to the battery through the inverter by acquiring the target voltage vector required for motor operation and combining with the target voltage vector, so that the energy stored in the motor winding can be charged back to the battery through the inverter during the normal operation of the motor, and the high-efficiency heating of the battery is achieved by utilizing the heat generated inside the battery itself, which is beneficial to maintaining the temperature of the battery within the temperature range required by the normal work of the battery.

Regarding the above step 320, the controlling, according to the target voltage vector, a motor winding to output a pulse current to a battery through an inverter specifically includes: determining, according to the target voltage vector, a first action duration of a pulse vector in a preset period; and controlling, in the first action duration, the motor winding to output the pulse current to the battery through the inverter.

In particular, the motor winding, the inverter and the battery may form a freewheeling loop within the first action duration, and the energy stored in the motor winding may be charged back to the battery via the inverter through the freewheeling loop.

Exemplarily, based on a space vector pulse width modulation algorithm, a circular rotating magnetic field can be generated. Taking a three-phase alternating-current motor as an example, in order to generate a constant electromagnetic torque and meet the electric demand in the running process of electric vehicle, a space vector hexagon can be generated based on the space vector pulse width modulation algorithm controlled by a three-phase inverter motor, which includes six effective voltage vectors and two voltage zero vectors. In each preset cycle, by outputting the effective voltage vectors to the motor winding within a period of duration, the demand for electricity required for motor operation can be guaranteed. In another period of duration in the preset period, the motor winding can be controlled to output the pulse current to the battery through the inverter, so that the energy stored in the motor winding can be charged back to the battery through the inverter, and efficient heating can be achieved.

Specifically, in a period of duration in a preset period, two adjacent effective voltage vectors can be selected to act for a period of time respectively, that is, the motor winding and the inverter are controlled to form a discharge loop with the battery, and at this time, a current flow direction is: positive electrode of battery→inverter→motor winding→negative electrode of battery. In another period of duration in the preset period, the motor winding, the inverter and the battery form a freewheeling loop. At this time, the current flow direction is: motor winding→inverter→positive electrode of battery→negative electrode of battery.

In the embodiments of the present application, the first action duration of the pulse vector in the preset period is calculated according to the target voltage vector required for the motor operation, and in the first action duration, the motor winding is controlled to output the pulse current to the battery through the inverter, so that the heat generated in the battery itself can be utilized to achieve high-efficiency heating of the battery, and the influence of power output in the motor winding on the normal operation of the motor can be avoided.

In some embodiments of the present application, regarding step 310 above, the acquiring a target voltage vector required for motor operation may include acquiring a first temperature of the battery; acquiring operation parameters of the battery when the first temperature of the battery is less than a first temperature threshold; and acquiring the target voltage vector required for the motor operation when the operating parameters of the battery meet a heating condition of a preset pulse voltage heating mode.

As a specific example, a temperature detection unit may be connected in a battery heating system. The first temperature of the battery can be acquired by the temperature detection unit according to a certain frequency. The temperature detection unit may transmit the first temperature to the control device. A control module acquires the first temperature of the battery through the temperature detection unit, and determines whether the battery needs to be heated according to a relationship between the first temperature and the first temperature threshold.

As a specific example, the temperature detection unit may perform temperature detection using a thermistor to obtain the first temperature of the battery. The thermistor may be a Negative Temperature Coefficient (NTC) thermistor, a Positive Temperature Coefficient (PTC) thermistor, and the like, which is not limited herein. The temperature detecting unit may also be a temperature sensor, and the first temperature may also be acquired according to a certain frequency by a temperature sensor provided on a surface of the battery P1 or inside the battery P1, which is not limited herein.

In some embodiments, the control module may determine whether the battery needs to be heated based on the relationship between the first temperature and the first temperature threshold. If the control module determines that the battery needs to be heated, the operating parameters of the battery may be acquired to determine whether the battery meets the heating condition of the preset pulse voltage heating mode. For example, the operating parameters may include the State of Charge (SOC) of the battery, the voltage of the battery, the current of the battery and other operating data of the battery. The heating condition of the preset pulse voltage heating mode may include, for example, whether the charge amount of the battery is higher than a preset charge amount; and whether the motor works normally, to improve the safety of heating the battery.

Exemplarily, the control device is a MCU. During the operation of the motor, the operating parameters of the battery may also include parameter information of the motor connected to the battery. Exemplarily, the parameter information of the motor may include data such as motor voltage, current, etc. According to the parameter information of the motor, the MCU may determine whether the motor is in a normal operation state. The MCU may send operating state information of the motor to the VCU, for example, the operating state information may include that the motor is in a normal operating state.

When the operating parameters of the battery meet the heating condition of the preset pulse voltage heating mode, the operating parameters of the battery are obtained.

According to the embodiments of the present application, in a state where the battery temperature is less than the first temperature threshold, the battery needs to be heated. Next, by determining the operating parameter information of the battery, whether the operation states of the battery and the motor meet a preset pulse voltage condition are determined, so that the safety and reliability of the motor in the operation process can be improved.

In some embodiments of the present application, regarding step 310, the determining, according to the target voltage vector, a first action duration of a pulse vector in a preset period specifically includes: determining, according to preset space vector pulse width modulation information, a target sector of the target voltage vector in the preset space vector pulse width modulation information; determining a second action duration of an effective voltage vector in the preset period according to an amplitude of the target voltage vector and positional relationship information between the target voltage vector and the target sector; and determining the first action duration of the pulse vector according to a difference between the preset period and the second action duration.

Figure 4:
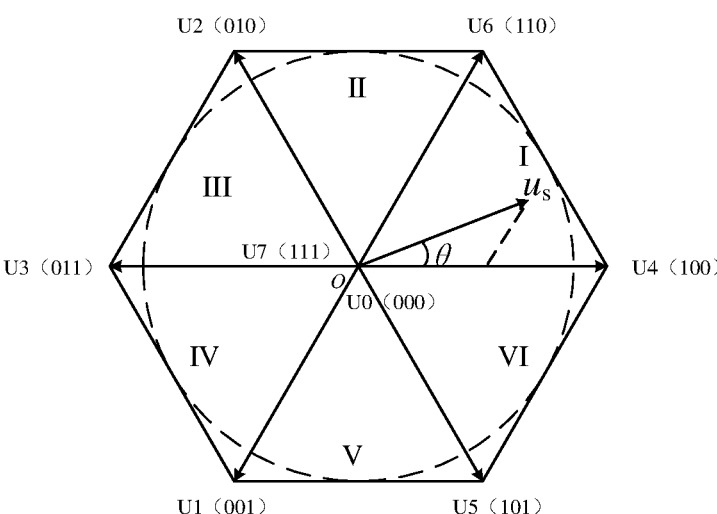
FIG. 4 is a schematic diagram of first preset space vector pulse width modulation information provided by the embodiments of the present application.

Specifically, the preset space vector pulse width modulation information may be a Space Vector Pulse Width Modulation (SVPWM) algorithm. Accordingly, a plurality of effective voltage vectors and a plurality of sectors may be included in the preset space vector pulse width modulation information, and a sector is formed between adjacent effective voltage vectors, that is, a plurality of sectors are included in the preset space vector modulation information. Exemplarily, FIG. 4 is a schematic diagram of first preset space vector pulse width modulation information provided by the embodiments of the present application. Referring to FIG. 4, a space hexagon rotating magnetic field including six effective voltage vectors and two voltage zero vectors is generated by the space vector pulse width modulation algorithm based on the space vector pulse width modulation controlled by the three-phase alternating-current motor, and a sector is formed between two adjacent effective voltages. As shown in FIG. 4, the effective voltage vectors include U1, U2, U3, U4, U5, and U6, the zero vectors include U0 and U7, and the sectors include a first sector I, a second sector II, a third sector III, a fourth sector IV, a fifth sector V, and a sixth sector VI.

The target voltage vector required for motor operation includes a direction and an amplitude, and the target voltage vector may be us as shown in combination with FIG. 4, and the target sector of the target voltage vector in the preset space vector pulse width modulation information may be determined according to the direction included in the target voltage vector. If the target voltage vector us falls within the first sector I, the effective voltage vectors U4 and U6 forming the first sector I can thus be obtained. The target voltage vector us can be generated by a linear combination of the effective voltage vectors U4 and U6.

The positional relationship information between the target voltage vector and the target sector includes included angle information between the target voltage vector and the effective voltage vector. For example, as shown in FIG. 4, the effective voltage vector U4 may serve as a starting edge of the target sector, and an included angle between the target voltage vector us and the effective voltage vector U4 is θ.

In a preset period, the action time t1 of the effective voltage vector U4 and the action time t2 of the effective voltage vector U6 can be calculated using sine theorem, cosine theorem and vector composition rule, where t1+t2 is a second action duration of effective voltage vectors. If the preset period is denoted as T, the first action duration of the pulse vector meets the following equation: t0=T−(t1+t2).

According to the embodiments of the present application, the second action duration of the effective voltage vector in the preset period can be determined from the positional relationship information of the target voltage vector and the target sector in the preset space vector pulse width modulation information. Since the target voltage vector required for motor operation can be provided, i.e., can be met, in a discharge circuit formed by the battery, the inverter and the motor winding in the second action duration, the battery can be quickly heated without affecting the motor operation in the first action duration in the preset period. Especially in a low temperature environment, it is beneficial to maintain the temperature of the battery within the temperature range required for its normal work.

In some embodiments, the first action duration is that the action time of the pulse voltage vector can be set in any time period within a preset period, so that the battery can be conveniently heated by the pulse current in the freewheeling loop.

As a specific example, an action time of the pulse vector is between action time of different effective voltage vectors. Specifically, in a preset period, the target voltage vector is acted by at least two effective voltage vectors for a period of time. By controlling the switching unit in the inverter to be turned on or off, different effective voltage vectors can be switched.

Figure 5:
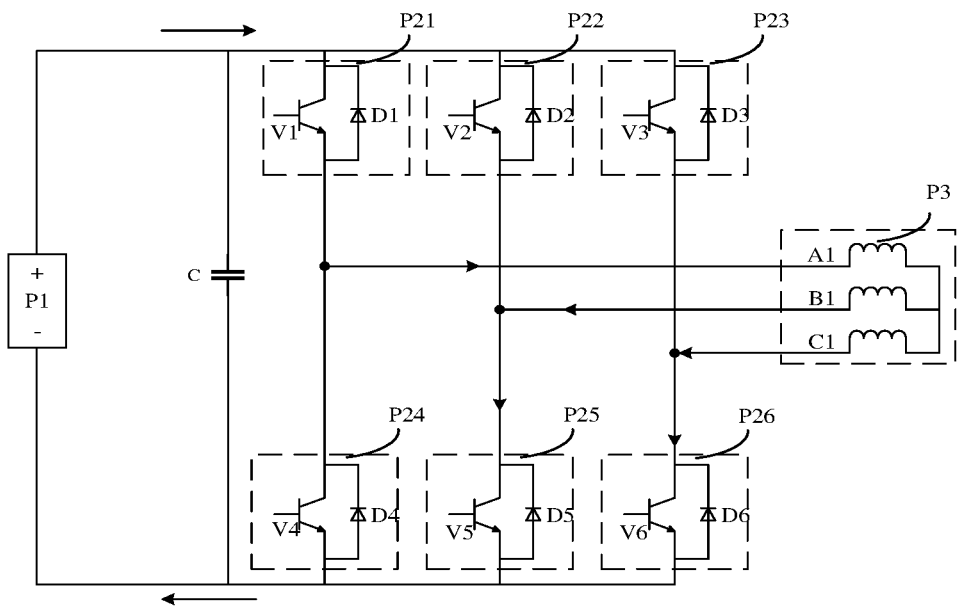
FIG. 5 is a schematic diagram of a current flow direction of a first motor working state provided by the embodiments of the present application.

FIG. 5 is a schematic diagram of a current flow direction of a first motor working state provided by the embodiments of the present application. As shown in FIG. 5, the first switching unit P21 includes a switching transistor V1 and a freewheeling diode D1, the second switching unit P22 includes a switching transistor V2 and a freewheeling diode D2, the third switching unit P23 includes a switching transistor V3 and a freewheeling diode D3, the fourth switching unit P24 includes a switching transistor V4 and a freewheeling diode D4, the fifth switching unit P25 includes a switching transistor V5 and a freewheeling diode D5, and the sixth switching unit P26 includes a switching transistor V6 and a freewheeling diode D6.

Exemplarily, taking the effective voltage vectors U4 and U6 as examples, the second action duration in the preset period includes the action time t1 of the effective voltage vector U4 and the action time t2 of the effective voltage vector U6. During the action time of the effective voltage vector U4, the states of the switching transistors V1, V2 and V3 are 100, and the states of the corresponding switching transistors V5, V6 and V7 are 011, where 1 represents tuning on and 0 represents turning off. In the action time of the effective voltage vector U4, as shown in combination with FIG. 5, the current flow direction is: positive electrode of battery→V1→A1→B1 & C1→V5 & V6→negative electrode of battery.

In the preset period, the action time of the effective voltage vector U6 is t2. When the action time of the effective voltage vector U4 reaches t1, the control device may output a drive signal to control the states of switching transistors V1, V2 and V3 to be 110, and the states of corresponding switching transistors V5, V6 and V7 to be 001.

Figure 6:
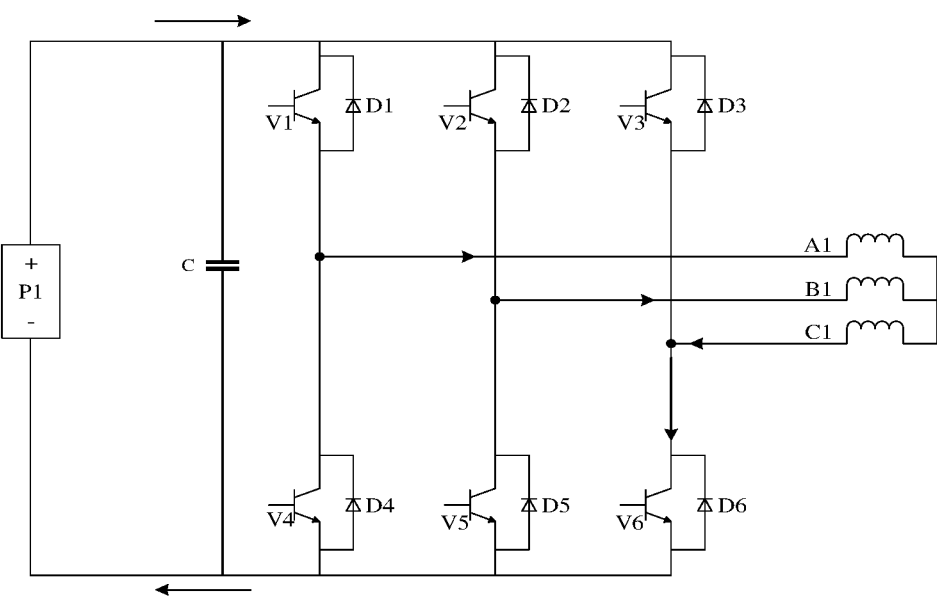
FIG. 6 is a schematic diagram of a current flow direction of a second motor working state provided by the embodiments of the present application.

FIG. 6 is a schematic diagram of a current flow direction of a second motor working state provided by the embodiments of the present application. As shown in FIG. 6, within the action time t2 of the effective voltage vector U6, as shown in combination with FIG. 6, the current flow direction is: positive electrode of battery→V1 & V2→A1 & B1→C1→V6→negative electrode of battery.

Figure 7:
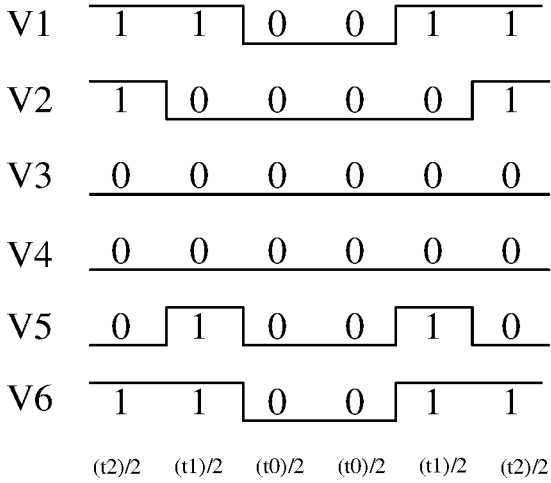
FIG. 7 is a schematic flow diagram of a switching unit control sequence provided by the embodiments of the present application.

In some embodiments, the action time of the pulse voltage may be set at any time position in a current preset period. Exemplarily, the action time of the pulse voltage may also be set between the action time of the same effective voltage vectors. In order to more clearly describe the control sequence of the switching unit in the embodiments of the present application, as a specific example, FIG. 7 is a schematic flow diagram of a switching unit control sequence provided by the embodiments of the present application. In a preset period, the action time t1 and t2 of the two effective voltage vectors U4 and U6 are bisected and placed at the beginning and end of the preset period, and the action time of the pulse vector is placed in the middle of the switching period and bisects the action time of the effective voltage vector U4. In the preset period, the switching sequence of the switches can be shown in FIG. 7.

Figure 8:
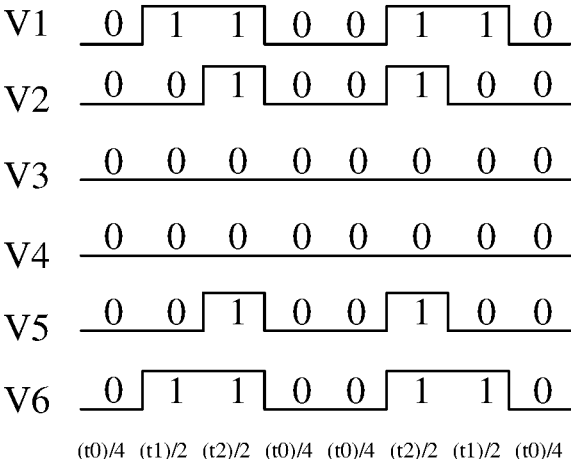
FIG. 8 is a schematic flow diagram of another switching unit control sequence provided by the embodiments of the present application.

In yet another specific embodiment, the preset pulse vector modulation can also select a seven-segment preset space vector pulse width modulation algorithm to generate a pulse current and achieve battery heating. As shown in continued combination with FIG. 4, the target voltage vector falls within the first sector and the control sequence based on the switching unit modulated with a seven-segment preset space may be as shown in FIG. 8. With the switching control sequence shown in FIG. 8, in a preset period, the action time t1 and t2 of the two effective voltage vectors U4 and U6 are split into two segments, respectively, and the action time of the pulse vector is split into four segments. Alternatively, the action time of the pulse vector may be placed at the beginning and end of the preset period, and the action time of the pulse vector is placed in the middle of the switching period, specifically the switching sequence of the switches may be as shown in FIG. 8.

It is to be understood that the switching sequence of the switches shown in FIG. 7 and FIG. 8 above is only for understanding the specific implementations of the embodiments of the present application and is not to be taken as a specific limitation to the technical solution of the present application.

Exemplarily, in a preset period, the action time of the pulse voltage may be between the action time of U4 and the action time of U6. Alternatively, the action time of the pulse voltage can be set at the beginning or the end of one preset period, so that the action time of the pulse voltage can be between the effective voltage vector in other preset periods and the effective voltage vector in the current preset period.

According to the embodiments of the present application, in switching of different effective voltages, the control device is required to control turning on or turning off of switching units in the inverter, so power is consumed during switching of the switches. By setting the action time of the pulse voltage between the action time of different effective voltage vectors, the switching times of the switching units can be reduced, thereby reducing the redundant power consumption caused by turning on or turning off the switching units.

As a specific example, the inverter includes a plurality of switching units, each of the plurality of switching units includes a switching transistor and a freewheeling diode, and the switching transistor and freewheeling diode are connected in parallel. Referring to the above step 320, it may concretely include controlling, according to the target voltage vector, turning off of the switching transistor in each of the concretely switching units, to enable the motor winding to output a pulse current to the battery through the freewheeling diode.

Specifically, in a preset period, when the effective voltage vector U6 reaches t2, a drive signal can be output by the control device to control the states of the switching transistors V1, V2 and V3 to be 000, and the states of the corresponding switching transistors V5, V6 and V7 to be 000.

Figure 9:
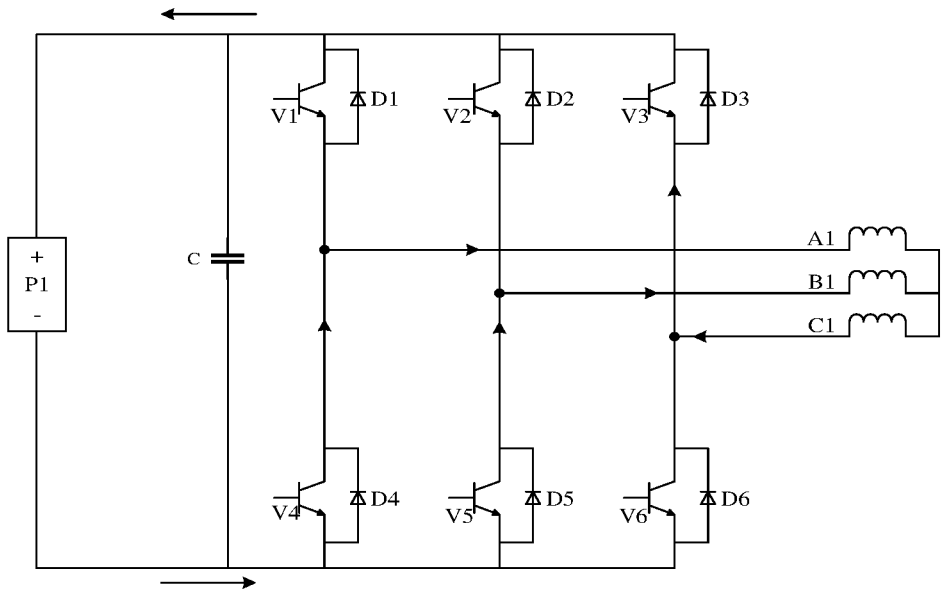
FIG. 9 is a schematic diagram of a current flow direction of a third motor working state provided by the embodiments of the present application.

FIG. 9 is a schematic diagram of a current flow direction of a third motor working state provided by the embodiments of the present application. As shown in FIG. 9, the states of the switching transistors V1, V2, and V3 are switched from 110 to 000, and the states of the switching transistors V5, V6, and V7 are switched from 001 to 000. Since inductive elements A1, B1 and C1 are included in the motor winding, the inductive elements may be such as inductors, and at the moment when all the switching transistors in the inverter are turned off, the current flow direction to the inductive elements A1, B1 and C1 is kept constant based on the hysteresis characteristic of the inductive elements, the freewheeling diode D4 in the switching unit P24, the freewheeling diode D5 in the switching unit P25 and the freewheeling diode D3 in the switching unit P23 are turned on forward, and a pulse current is generated in the freewheeling loop of the battery, the inverter and the motor winding, so that the battery is in a charged state. As shown in FIG. 9, the current flow direction is: negative electrode of battery→D4 & D5→A1 & B1→C1→D3→positive electrode of battery.

According to the embodiments of the present application, by controlling the turning off of the switching transistor in each of the switching units, energy stored in a stator winding is charged back to the battery through the freewheeling diode in the inverter, and a large instantaneous pulse current is generated to form a freewheeling loop. Therefore, pulse heating for the battery can be achieved during the operation of the motor, which can effectively overcome the problem that the battery temperature gradually decreases during the operation of the motor in a low temperature environment.

In some embodiments of the present application, temperature changes of the battery may also be monitored in real time during heating of the battery based on a preset pulsed voltage heating mode. In particular, the method may include: acquiring a second temperature of the battery, the second temperature being a temperature collected in real time when the battery is in the preset pulse voltage heating mode; and stopping heating the battery or entering a preset vector control mode when the second temperature is greater than or equal to a second temperature threshold.

Exemplarily, the second temperature of the battery may be acquired by the temperature detection unit at a certain frequency. The temperature detection unit may transmit the second temperature to the control device. The control module acquires the second temperature of the battery through the temperature detection unit, and determines whether to heat the battery continuously or switch the heating mode according to the relationship between the second temperature and the second temperature threshold. Exemplarily, the second temperature threshold may be the temperature at which the battery temperature reaches the normal work requirement. When the second temperature is greater than or equal to the second temperature threshold, heating for the battery may be stopped, and the heating mode may be switched to a preset vector control mode with a slower heating speed.

In some embodiments, control commands may also be input by a user to switch the preset pulse voltage heating mode to the battery heating mode or the preset vector control mode, which is not specifically limited herein.

Exemplarily, when the battery is heated based on the preset vector control mode, a circulation of the current formed inside the inverter and motor windings may generate heat to heat the coolant. Then, the battery is heated by the heated coolant, so that the temperature of the battery can be maintained within the temperature range required for its work.

As a specific example, the preset vector control mode may heat the battery based on a space vector pulse width modulation algorithm. Taking a three-phase alternating-current motor, based on the space vector pulse width modulation algorithm of the three-phase alternating-current motor, a space vector hexagon can be generated, including six effective voltage vectors and two voltage zero vectors, as can be shown in FIG. 4.

In the preset vector control mode, one preset period includes the second action duration of the effective voltage vector and a third action duration of the zero vector.

Exemplarily, a magnitude of a stator flux linkage vector increment can be controlled by inserting the zero vector in order to meet the power demand during the operation of the motor. The increment of stator flux linkage vector is 0, when zero vector acts. By the combination of zero vector and effective vector, the required power can be provided for the operation of the motor. With continued reference to FIG. 4, the target voltage vector may be us and a target sector of the target voltage vector in the preset space vector pulse width modulation information may be determined according to the direction included in the target voltage vector. In FIG. 4, the target voltage vector us falls within the first sector I, the action time t1 of the effective voltage vector U4 and the action time t2 of the effective voltage vector U6 can be calculated using sine theorem, cosine theorem and vector composition rule, where t1+t2 is a second action duration of the effective voltage vectors. At this time, the zero vector is needed to supplement the remaining time in the remaining preset period. If the preset period is denoted as T, in the preset period, the third action time of zero vector meets the following equation: t3=T−(t1+t2).

Figure 10:
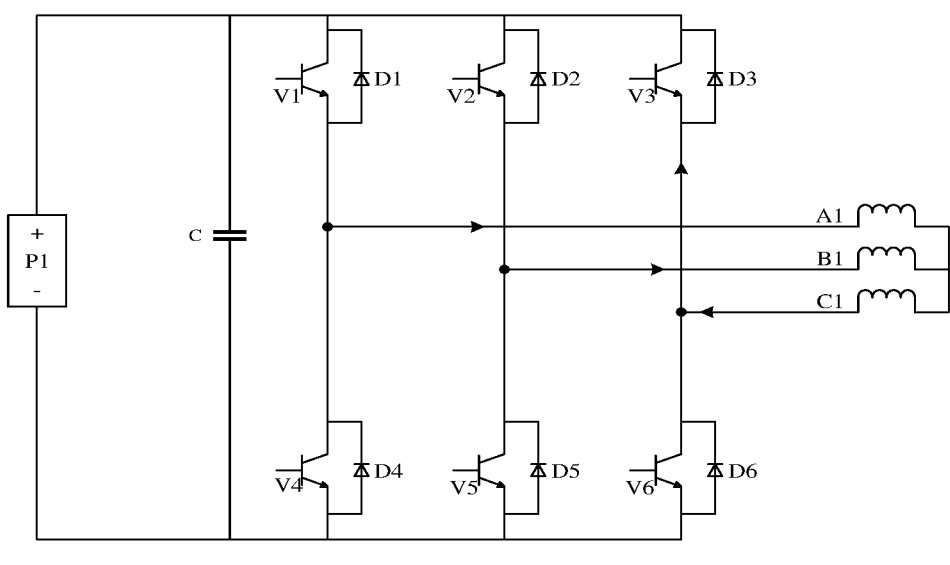
FIG. 10 is a schematic diagram of a current flow direction of a fourth motor working state provided by the embodiments of the present application.

As a specific example, the control device controls all the upper legs to be turned on and all the lower legs to be turned off, or all the upper legs to be turned off and all the lower legs to be turned on in the inverter, so as to achieve the insertion of zero vector by outputting drive signals. FIG. 10 is a schematic diagram of a current flow direction of a fourth motor working state provided by the embodiments of the present application. As shown in combination with FIG. 10, the control device outputs a drive signal to control the states of the switching transistors V1, V2 and V3 to be switched from 110 to 111, and the states of the corresponding switching transistors V5, V6 and V7 to be switched from 001 to 000. That is to say, the switching transistors in the switching unit in the upper leg of the inverter are turned on at the same time, and the switching transistors in the switching unit in the lower leg of the inverter are turned off at the same time, at which time the motor winding current is circulated internally in a direction of V1&V2→A1&B1→C1→V3→V1&V2.

The control device can also determine whether the battery temperature has abnormal temperature change according to the change of the second temperature. For example, if the second temperature jumps up or down in a short time, the battery temperature changes abnormally. The VCU in the control device can generate a control signal to the MCU, so that the MCU stops heating the battery according to the control signal.

According to the embodiments of the present application, temperature change information of the battery in a heating process is monitored in real time by acquiring the second temperature of the battery. The safety and reliability of heating the battery during the motor operation can be improved by determining whether the battery needs switching of the heating mode or stopping heating according to the second temperature of the battery.

In some embodiments, the stopping heating the battery or entering a preset vector control mode when the second temperature is greater than or equal to a second temperature threshold includes: acquiring a third temperature of an operating environment of the battery; entering the preset vector control mode when the third temperature is less than a third temperature threshold (also referred to as an "environment temperature threshold"); and stopping heating the battery when the third temperature is greater than or equal to the third temperature threshold.

Specifically, the third temperature of the operating environment can be acquired by the temperature detection unit at a certain frequency. The temperature detection unit may transmit the third temperature to the control device. The control module acquires the third temperature of the battery through the temperature detection unit, and determines whether to switch the heating mode of the battery according to the relationship between the third temperature and the third temperature threshold.

The temperature corresponding to the third temperature threshold can be determined according to whether the operating environment temperature can meet the temperature requirement of normal operation of the battery.

When the third temperature is greater than or equal to the third temperature threshold, it is indicated that the current operating environment temperature can maintain the temperature of the battery within the temperature range required for its normal work, and no additional heating of the battery is needed, so that heating of the battery can be stopped. When the third temperature is less than the third temperature threshold, it is indicated that the battery temperature can be maintained in the temperature range required for normal work by heating the battery through the preset vector control mode under the current operating environment.

According to the embodiments of the present application, the third temperature of the operating environment of the battery is acquired, and the heating mode of the battery is adjusted according to the third temperature, thereby ensuring the safety and reliability of the battery heating system.

In order to better understand the control method of the battery heating system provided by the embodiments of the present application, embodiments of the control method of the battery heating system in a practical application are provided herein based on the same inventive concept.

Figure 11:
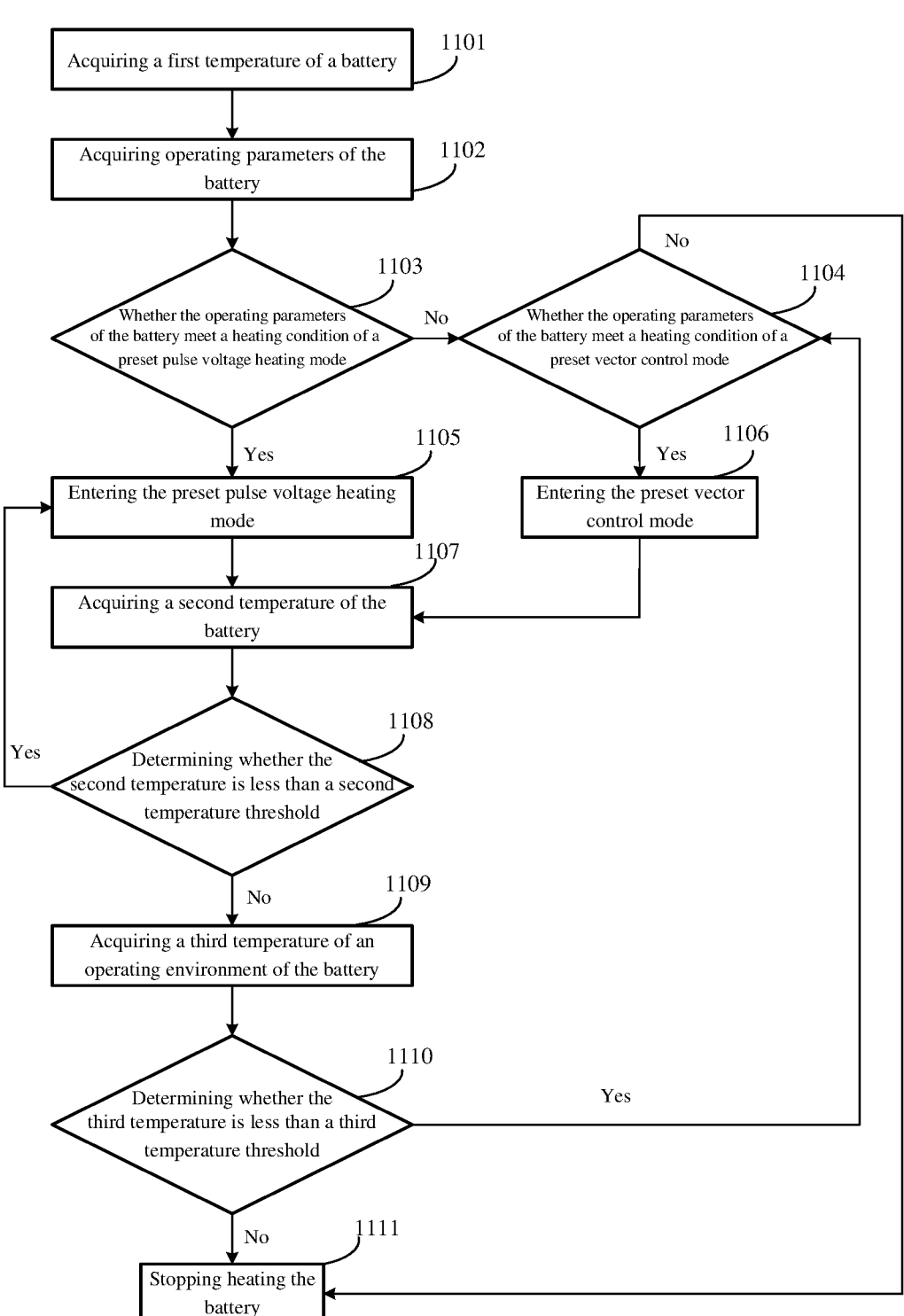
FIG. 11 is a schematic flow diagram of another control method of a battery heating system provided by the embodiments of the present application.

FIG. 11 is a schematic flow diagram of another control method of a battery heating system provided by the embodiments of the present application. As shown in conjunction with FIG. 11, the control method of the battery heating system may include steps 1101 to 1111.

Step 1101, acquiring a first temperature of a battery.

The first temperature of the battery is the temperature of the battery when the motor is in an operating state. The first temperature of the battery can be acquired by the temperature detection unit according to a certain frequency. The temperature detection unit may transmit the first temperature to the control device. The control device determines whether the battery needs to be heated according to the relationship between the first temperature and the first temperature threshold.

When the first temperature is less than the first temperature threshold, step 1102 may be performed.

Step 1102, acquiring operating parameters of the battery.

Exemplarily, the operating parameters of the battery may include the SOC of the battery, the voltage of the battery, the current of the battery and other operating data of the battery. During the operation of the motor, the operating parameters of the battery may also include parameter information of the motor connected to the battery. Exemplarily, the parameter information of the motor may include data such as motor voltage, current, etc. According to the parameter information of the motor, the MCU may determine whether the motor is in a normal operation state. The MCU may send operating state information of the motor to the VCU, for example, the operating state information may include that the motor is in a normal operating state.

Step 1103, whether the operating parameters of the battery meet a heating condition of a preset pulse voltage heating mode.

Exemplarily, the heating condition of the preset pulse voltage heating mode may include: for example, whether the charge amount of the battery is higher than a preset first charge amount; and whether the motor works normally to improve the safety of heating the battery. There is no specific restriction on the heating condition of the preset pulse voltage heating mode herein.

When the operating parameters of the battery meet the heating condition of the preset pulse voltage heating mode, step 1105 can be directly executed. When the operating parameters of the battery do not satisfy the heating condition of the preset pulse voltage heating mode, step 1104 may be executed.

Step 1104, whether the operating parameters of the battery meet a heating conditions of a preset vector control mode.

Exemplarily, the heating condition of the preset vector control mode may include: for example, whether the charge amount of the battery is higher than a preset second charge amount; and whether the motor works normally or not. There is no specific restriction on the heating condition of the preset vector control mode herein.

When the operating parameters of the battery meet the heating condition of the preset vector control mode, step 1106 is executed. When the operating parameters of the battery do not meet the heating condition of the preset vector control mode, step 1111 can be directly executed to stop heating the battery.

Step 1105, entering a preset pulse voltage heating mode.

In the preset pulse voltage heating mode, a first action duration of the pulse vector and a second action duration of the effective voltage vector in the preset period can be determined according to the target voltage vector required for motor operation. In the second action duration in the preset period, the motor winding and the inverter are controlled to form a discharge loop with the battery, which can provide energy for the motor operation. In the first action duration in the preset period, the motor winding and the inverter are controlled to form a freewheeling loop with the battery, so that the energy stored in the motor winding can be charged back to the battery through the inverter, and the heat generated inside the battery itself is used to heat the battery, which can provide more heat for the battery heating in the working process of the battery, and is beneficial to maintaining the temperature of the battery within the temperature range required for normal work.

Step 1106, entering a preset vector control mode.

In the preset vector control mode, one preset period includes the second action duration of the effective voltage vector and a third action duration of the zero vector.

Specifically, a second action duration of the effective voltage vector and a third action duration of the zero vector in the preset period are determined according to the target voltage vector required for motor operation. In the second action duration in the preset period, the motor winding and the inverter are controlled to form a discharge loop with the battery, which can provide energy for the motor operation. In the third action duration in the preset period, a circulation of the current formed inside the inverter and the motor windings may generate heat to heat the coolant. Then, the battery is heated by the heated coolant, so that the temperature of the battery can be maintained within the temperature range required for its work.

Step 1107, acquiring a second temperature of the battery.

Specifically, the second temperature is the battery temperature collected in real time when the battery is in the preset pulse voltage heating mode. The second temperature of the battery can be acquired by the temperature detection unit according to a certain frequency.

Step 1108, determining whether the second temperature is less than the second temperature threshold.

Specifically, the temperature detection unit may transmit the second temperature to the control device. The control module acquires the second temperature of the battery through the temperature detection unit, and determines whether to heat the battery continuously or switch the heating mode according to the relationship between the second temperature and the second temperature threshold. Exemplarily, the second temperature threshold may be the temperature at which the battery temperature reaches the normal work requirement. When the second temperature is greater than or equal to the second temperature threshold, heating for the battery may be stopped, and the heating mode may be switched to a preset vector control mode with a slower heating speed.

Step 1109, acquiring a third temperature of the battery operating environment.

Specifically, the third temperature is the temperature of the operating environment in which the battery is located. Optionally, the temperature corresponding to the third temperature threshold can be determined according to whether the operating environment temperature can meet the temperature requirement of normal operation of the battery.

The third temperature of the battery operating environment can be acquired by the temperature detection unit at a certain frequency. The temperature detection unit may transmit the third temperature to the control device.

Step 1110, determining whether the third temperature is less than the third temperature threshold.

Specifically, the control module acquires the third temperature of the battery through the temperature detection unit, and determines whether to switch the heating mode of the battery according to the relationship between the third temperature and the third temperature threshold. When the third temperature is greater than or equal to the third temperature threshold, it is indicated that the current operating environment temperature can maintain the temperature of the battery within the temperature range required for its normal work, and no additional heating of the battery is needed. Therefore, step 1111 can be performed.

When the third temperature is less than the third temperature threshold, it is indicated that the battery temperature can be maintained in the temperature range required for normal work by heating the battery through the preset vector control mode under the current operating environment. Thus, it is possible to return to executing step 1104 to determine whether the operating parameters of the battery satisfy the heating condition of the preset vector control mode. When the operating parameters of the battery meet the heating condition of the preset vector control mode, step 1106 can be executed to enter the preset vector control mode to heat the battery.

Step 1111, stopping heating the battery.

In the embodiments of the present application, when the battery provides a target voltage vector for the motor based on the voltage vector required for motor operation, the first action duration of the pulse vector and the second action duration of the effective voltage vector in the preset period are determined according to the target voltage vector. In the second action duration, the motor winding and the inverter are controlled to form a discharge loop with the battery, which can provide energy for the motor operation. In the first action duration, the motor winding and the inverter are controlled to form a freewheeling loop with the battery, so that the energy stored in the motor winding can be charged back to the battery through the inverter, and the heat generated inside the battery itself is used to efficiently heat the battery, which can provide more heat for the battery heating in the working process of the battery, and is beneficial to maintaining the temperature of the battery within the temperature range required for normal work.

Other details of the control device of the battery heating system according to the embodiments of the present application are similar to those of the control method of the battery heating system described above in combination with the examples described in FIGS. 1 to 11, and can achieve the corresponding technical effects thereof, and are not repeated herein for concise description.

Based on the same inventive concept, the present application also provides a control device 1200 of a battery heating system corresponding to the above-mentioned control method of the battery heating system. Specific description will be given in detail with reference to FIG. 12.

Figures 12, 13:
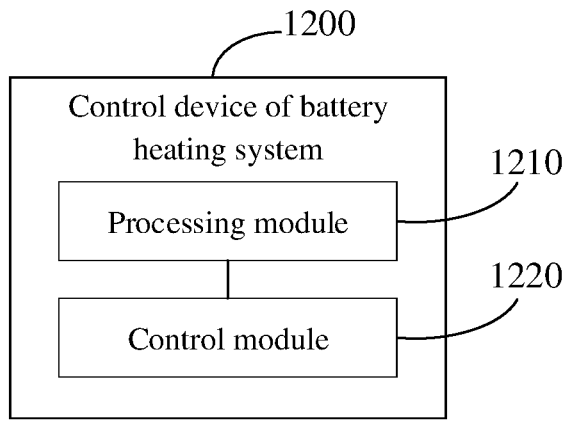
FIG. 12 is a schematic structural diagram of a control device of a battery heating system provided by the embodiments of the present application.
FIG. 13 is a schematic structural diagram of electronic equipment provided by the embodiments of the present application.

FIG. 12 is a schematic structural diagram of a control device of a battery heating system provided by the embodiments of the present application, the battery heating system includes an inverter and a motor winding, and the inverter is connected to the motor winding and the battery respectively. As shown in FIG. 12, the control device 1200 of the battery heating system may include an acquisition module 1210 and a control module 1220.

The acquisition module 1210 is configured to acquire a target voltage vector required for motor operation; and the control module 1220 is configured to control the motor winding to output a pulse current to the battery through the inverter according to the target voltage vector.

In the technical solution of the embodiments of the present application, the motor winding is controlled to output the pulse current to the battery through the inverter by acquiring the target voltage vector required for motor operation and combining with the target voltage vector, so that the energy stored in the motor winding can be charged back to the battery through the inverter during the normal operation of the motor, and the high-efficiency heating of the battery is achieved by utilizing the heat generated inside the battery itself, which is beneficial to maintaining the temperature of the battery within the temperature range required by the normal work of the battery.

In some embodiments, the device further includes:

a processing module, configured to determine a first action duration of the pulse vector in a preset period according to the target voltage vector; and a control module 1220, further configured to control the motor winding to output a pulse current to the battery through the inverter during a first action duration.

In the technical solution of the embodiments of the present application, the motor winding is controlled to output the pulse current to the battery through the inverter by acquiring the target voltage vector required for motor operation and combining with the target voltage vector, so that the energy stored in the motor winding can be charged back to the battery through the inverter during the normal operation of the motor, and the high-efficiency heating of the battery is achieved by utilizing the heat generated inside the battery itself, which is beneficial to maintaining the temperature of the battery within the temperature range required by the normal work of the battery.

In some embodiments, the control module 1220 is further configured to determine, according to preset space vector pulse width modulation information, a target sector of the target voltage vector in the preset space vector pulse width modulation information;

the control module 1220 is further configured to determine a second action duration of an effective voltage vector in the preset period according to an amplitude of the target voltage vector and positional relationship information between the target voltage vector and the target sector; and the control module 1220 is further configured to determine the first action duration of the pulse vector according to a difference between the preset period and the second action duration.

According to the embodiments of the present application, the second action duration of the effective voltage vector in the preset period can be determined from the positional relationship information between the target voltage vector and the target sector in the preset space vector pulse width modulation information. Since the target voltage vector required for motor operation can be provided, i.e., can be met, in a discharge circuit formed by the battery, the inverter and the motor winding in the second action duration, the battery can be quickly heated without affecting the motor operation in the first action duration in the preset period. Especially in a low temperature environment, it is beneficial to maintain the temperature of the battery within the temperature range required for its normal work.

In some embodiments, an action time of the pulse vector is between action time of different effective voltage vectors.

According to the embodiments of the present application, in switching of different effective voltages, the control device is required to control turning on or turning off of switching units in the inverter, so power is consumed during switching of the switches. By setting the action time of the pulse voltage between the action time of different effective voltage vectors, the switching times of the switching units can be reduced, thereby reducing the redundant power consumption caused by turning on or turning off the switching unit.

In some embodiments, the inverter includes a plurality of switching units, each of the plurality of switching units including a switching transistor and a freewheeling diode, the switching transistor and freewheeling diode being connected in parallel;

The control module 1220 is further configured to control, according to the target voltage vector, turning off of the switching transistor in each of the plurality of switching units, to enable the motor winding to output a pulse current to the battery through the freewheeling diode.

According to the embodiments of the present application, by controlling the turning off of the switching transistor in each of the switching units, energy stored in a stator winding is charged back to the battery through the freewheeling diode in the inverter, and a large instantaneous pulse current is generated to form a freewheeling loop. Therefore, pulse heating for the battery can be achieved during the operation of the motor, which can effectively overcome the problem that the battery temperature gradually decreases during the operation of the motor in a low temperature environment.

In some embodiments, the acquisition module 1210 is further configured to acquire a first temperature of the battery;

the acquisition module 1210 is further configured to acquire operating parameters of the battery when the first temperature of the battery is less than the first temperature threshold; and the acquisition module 1210 is also configured to acquire the target voltage vector required for the motor operation when the operating parameters of the battery meet a heating condition of a preset pulse voltage heating mode.

According to the embodiments of the present application, in a state where the battery temperature is less than the first temperature threshold, the battery needs to be heated. Next, by determining the operating parameter information of the battery, whether the operation states of the battery and the motor meet a preset pulse voltage condition are determined, so that the safety and reliability of the motor in the operation process can be improved.

In some embodiments, the acquisition module 1210 is further configured to acquire a second temperature of the battery, the second temperature being a temperature collected in real time when the battery is in the preset pulse voltage heating mode; and The control module 1220 is further configured to stop heating the battery or enter a preset vector control mode when the second temperature is greater than or equal to a second temperature threshold.

According to the embodiments of the present application, temperature change information of the battery in a heating process is monitored in real time by acquiring the second temperature of the battery. The safety and reliability of heating the battery during the motor operation can be improved by determining whether the battery needs switching of the heating mode or stopping heating according to the second temperature of the battery.

In some embodiments, the acquisition module 1210 is further configured to acquire a third temperature of an operating environment of the battery;

the control module 1220 is further configured to enter the preset vector control mode when the third temperature is less than a third temperature threshold; and the control module 1220 is further configured to stop heating the battery when the third temperature is greater than or equal to the third temperature threshold.

According to the embodiments of the present application, the third temperature of the operating environment of the battery is acquired, and the heating mode of the battery is adjusted according to the third temperature, thereby ensuring the safety and reliability of the battery heating system.

It is to be understood that the control device 1200 of the battery heating system according to the embodiments of the present application may correspond to an executive object of the control method of the battery heating system provided by the embodiments of the present application, and the specific details of the operation and/or function of each module/unit of the control device 1200 of the battery heating system may refer to the description of corresponding parts of the control method of the battery heating system described in the above-mentioned embodiments of the present application, and the corresponding technical effects can be achieved, which are not described herein for brevity.

FIG. 13 is a schematic structural diagram of electronic equipment provided by the embodiments of the present application. As shown in FIG. 13, the device may include a processor 1301 and a memory 1302 storing computer program instructions.

Specifically, the processor 1301 described above may include a Central Processing Unit (CPU), or an Application Specific Integrated Circuit (ASIC), or may be configured to implement one or more integrated circuits of embodiments of the present application.

The memory 1302 may include a mass memory for information or instructions. For example and not for limitation, the memory 1302 may include a Hard Disk Drive (HDD), a floppy disk drive, a flash memory, an optical disk, a magneto-optical disk, a magnetic tape, or a Universal Serial Bus (USB) drive, or a combination of two or more of these. In one example, the memory 1302 may include removable or non-removable (or fixed) media or the memory 1302 may be a non-volatile solid-state memory. The memory 1302 may be internal or external to the electronic equipment.

The memory may include read-only memory (ROM), random access memory (RAM), magnetic disk storage media devices, optical storage media devices, flash memory devices, electrical, optical, or other physical/tangible memory storage devices. Thus, generally, the memory includes one or more tangible (non-transient) computer-readable storage media (e.g., memory devices) encoded with software including computer-executable instructions, and when the software is executed (e.g., by one or more processors), it is operable to execute operations described with reference to methods according to an aspect of the present disclosure.

The processor 1301 achieves the method described in the embodiments of the present application by reading and executing the computer program instructions stored in the memory 1302 and achieves the corresponding technical effect achieved by executing the method of the embodiments of the present application, which is not repeated herein for concise description.

In one example, the electronic equipment may also include a communication interface 1303 and a bus 1310. As shown in FIG. 13, the processor 1301, the memory 1302 and the communication interface 1303 are connected through the bus 1310 and complete communication with one another.

The communication interface 1303 is mainly used for implementing communication among modules, devices, units and/or equipment in embodiments of the present application.

The bus 1310 includes hardware, software or both, and is used for coupling components of online information traffic billing equipment to one another. By way of example, but not for limitation, the bus may include Accelerated Graphics Port (AGP) or other graphics bus, Extended Industry Standard Architecture (EISA) bus, Front Side Bus (FSB), Hyper Transport (HT) Interconnect, Industry Standard Architecture (ISA) bus, Unlimited Bandwidth Interconnect, Low Pin Count (LPC) bus, Memory Bus, Microchannel Architecture (MCA) bus, Peripheral Component Interconnect (PCI) bus, PCI-Express (PCI-X) bus, Serial Advanced Technology Accessories (SATA) bus, Video Electronics Standards Association Local Bus (VLB) or other suitable bus or a combination of two or more of these. The bus 1310 may include one or more buses where appropriate. Although particular buses are described and shown in embodiments of the present application, any suitable bus or interconnect is contemplated herein.

The electronic equipment may execute the control method of the battery heating system in the embodiments of the present application, thereby achieving the corresponding technical effect of the control method of the battery heating system described in the embodiments of the present application.

In addition, in combination with the control method of the battery heating system in the above embodiments, the embodiments of the present application may be achieved by providing a readable storage medium. Computer program instructions are stored on the readable storage medium; the computer program instruction, when being executed by the processor, implements any of the control methods of the battery heating system in the above embodiments. Examples of readable storage media may be non-transient machine-readable media such as electronic circuits, semiconductor memory devices, Read-Only Memory (ROM), floppy disks, Compact Disc Read-Only Memory (CD-ROM), optical disks, hard disks, and the like.

It is to be clarified that the present application is not limited to the specific configurations and processing described above and shown in the figures. For the sake of brevity, a detailed description of known methods is omitted herein. In the above embodiments, several specific steps are described and shown as examples. However, the method process of the present application is not limited to the specific steps described and shown, and those skilled in the art may make various changes, modifications and additions, or change the order between steps after understanding the spirit of the present application.

The functional blocks shown in the above-described structural block diagram may be implemented as hardware, software, firmware or a combination thereof. When implemented in hardware, it may be, for example, an electronic circuit, an Application Specific Integrated Circuit (ASIC), appropriate firmware, plug-ins, function cards, and the like. When implemented in software, elements of the present application are programs or code segments that are used to perform a desired task. The programs or code segments may be stored in a machine-readable medium or transmitted over a transmission medium or communication link via a data signal carried in a carrier wave. A "machine-readable medium" may include any medium capable of storing or transmitting information. Examples of machine-readable media include electronic circuits, semiconductor memory devices, Read-Only Memory (ROM), flash memory, Erasable Read Only Memory (EROM), floppy disks, Compact Disc Read-Only Memory (CD-ROM), optical disks, hard disks, fiber optic media, Radio Frequency (RF) links, and the like. The code segments may be downloaded via a computer network such as the Internet, an intranet, or the like.

It should also be noted that the exemplary embodiments referred to in the present application describe some methods or systems based on a series of steps or devices. However, the present application is not limited to the order of the above steps, that is, the steps may be performed in the order mentioned in the embodiment, or performed in the order different from the order in the embodiment or a plurality of steps may be performed simultaneously.

In addition, in combination with the control method, the device, and the readable storage medium of the battery heating system in the above embodiments, the embodiments of the present application may provide a computer program product for implementation. The instructions in the computer program product, when being executed by a processor of the electronic equipment, cause the electronic equipment to execute any of the control methods of the battery heating system of the above-described embodiments.

Aspects of the present disclosure are described above with reference to flow diagrams and/or block diagrams of methods, device (systems) and computer program products according to embodiments of the present disclosure. It should be understood that each block in the flow diagrams and/or block diagrams and a combination of blocks in the flow diagrams and/or block diagrams may be implemented by computer program instructions. The computer program instructions may be provided to a processor of a general purpose computer, a special purpose computer, or other programmable data processing device to generate a machine such that the instructions executed via the processor of the computer or other programmable data processing device enable the implementation of the functions/actions specified in one or more blocks of the flow diagrams and/or block diagrams. Such a processor may be, but is not limited to, a general purpose processor, a special purpose processor, a special application processor, or a field programmable logic circuit. It will also be appreciated that each block in the block diagrams and/or flow diagrams and a combination of blocks in the block diagrams and/or flow diagrams may also be implemented by special hardware performing the specified functions or actions, or may be implemented by a combination of special hardware and computer instructions.

The above description is only specific implementations of the present application, and those skilled in the art can clearly understand that for convenience and conciseness of description, the specific working processes of the above-described systems, modules and units can refer to the corresponding processes in the aforementioned method embodiments, which will not be repeated herein. It should be understood that the scope of protection of the present application is not limited thereto and that various equivalent modifications or alternatives can be readily contemplated by any person skilled familiar with the technical field within the scope of the technology disclosed herein, and such modifications or alternatives are to be covered within the scope of protection of the present application.

What is claimed is:

1. A control method of a battery heating system, wherein the battery heating system comprises an inverter and a motor winding, and the inverter is connected to the motor winding and a battery, the method comprising:

acquiring a target voltage vector required for motor operation; and controlling, according to the target voltage vector, the motor winding to output a pulse current to the battery through the inverter, comprising:

determining, according to the target voltage vector, a first action duration of a pulse vector in a preset period, comprising:

determining, according to preset space vector pulse width modulation information, a target sector of the target voltage vector in the preset space vector pulse width modulation information;

determining a second action duration of an effective voltage vector in the preset period according to an amplitude of the target voltage vector and positional relationship information between the target voltage vector and the target sector; and determining the first action duration of the pulse vector according to a difference between the preset period and the second action duration; and controlling, in the first action duration, the motor winding to output the pulse current to the battery through the inverter.

2. The method according to claim 1, wherein action time of the pulse vector is between action times of different effective voltage vectors.

3. The method according to claim 1, wherein:

the inverter comprises a plurality of switching units, each of the plurality of switching units comprises a switching transistor and a freewheeling diode, the switching transistor and the freewheeling diode are connected in parallel; and controlling, according to the target voltage vector, the motor winding to output the pulse current to the battery through the inverter further comprises:

controlling, according to the target voltage vector, turning off of the switching transistor in each of the plurality of switching units, to enable the motor winding to output the pulse current to the battery through the freewheeling diode.

4. The method according to claim 1, wherein acquiring the target voltage vector required for motor operation comprises:

acquiring a temperature of the battery;

acquiring operation parameters of the battery when the temperature of the battery is less than a temperature threshold; and acquiring the target voltage vector required for the motor operation when the operating parameters of the battery meet a heating condition of a preset pulse voltage heating mode.

5. The method according to claim 1, further comprising:

acquiring a temperature of the battery, the temperature being collected in real time when the battery is in the preset pulse voltage heating mode; and stopping heating the battery or entering a preset vector control mode when the temperature is greater than or equal to a temperature threshold.

6. The method according to claim 5, wherein stopping heating the battery or entering the preset vector control mode when the temperature is greater than or equal to the temperature threshold comprises:

acquiring a temperature of an operating environment of the battery;

entering the preset vector control mode when the temperature of the operating environment is less than an environment temperature threshold; and stopping heating the battery when the temperature of the operating environment is greater than or equal to the environment temperature threshold.

7. Electronic equipment, comprising:

a memory storing a program; and a processor configured to execute the program to implement the control method according to claim 1.

8. A control device of a battery heating system, wherein the battery heating system comprises an inverter and a motor winding, and the inverter is connected to the motor winding and a battery, the device comprising:

an acquisition module, configured to acquire a target voltage vector required for motor operation; and a control module, configured to control the motor winding to output a pulse current to the battery through the inverter according to the target voltage vector, comprising:

determining, according to the target voltage vector, a first action duration of a pulse vector in a preset period, comprising:

determining, according to preset space vector pulse width modulation information, a target sector of the target voltage vector in the preset space vector pulse width modulation information;

determining a second action duration of an effective voltage vector in the preset period according to an amplitude of the target voltage vector and positional relationship information between the target voltage vector and the target sector; and determining the first action duration of the pulse vector according to a difference between the preset period and the second action duration; and controlling, in the first action duration, the motor winding to output the pulse current to the battery through the inverter.

9. A battery heating system, comprising:

an inverter;

a motor winding; and the control device according to claim 8.

* * * * *